(12) United States Patent
Hahn et al.

(10) Patent No.: US 7,857,239 B2
(45) Date of Patent: Dec. 28, 2010

(54) SELF-PROPELLED WALKING SPRAY BOOM

(76) Inventors: Kent S. Hahn, 1625 N. Garvin St., Evansville, Vanderburgh County, IN (US) 47711; Brannon W. Polk, 1625 N. Garvin St., Evansville, Vanderburgh County, IN (US) 47711

( * ) Notice: Subject to any disclaimer, the term of this patent is extended or adjusted under 35 U.S.C. 154(b) by 407 days.

(21) Appl. No.: 12/070,248

(22) Filed: Feb. 15, 2008

(65) Prior Publication Data
US 2008/0197210 A1 Aug. 21, 2008

Related U.S. Application Data

(60) Provisional application No. 60/901,938, filed on Feb. 16, 2007.

(51) Int. Cl.
*B05B 9/06* (2006.01)

(52) U.S. Cl. ........................ 239/156; 239/159; 239/160; 239/164; 239/172

(58) Field of Classification Search ................. 239/156, 239/159, 160, 164, 172
See application file for complete search history.

(56) References Cited

U.S. PATENT DOCUMENTS

| | | | | |
|---|---|---|---|---|
| 3,118,607 A | * | 1/1964 | Rocher | 239/104 |
| 3,848,804 A | * | 11/1974 | Prestwich | 239/160 |
| 4,798,325 A | * | 1/1989 | Block | 239/663 |
| 5,333,795 A | * | 8/1994 | Jessen | 239/663 |
| 5,735,959 A | * | 4/1998 | Kubo et al. | 118/663 |
| 6,279,838 B1 | * | 8/2001 | Sivells et al. | 239/146 |
| 7,152,812 B1 | * | 12/2006 | Johnson | 239/164 |

\* cited by examiner

*Primary Examiner*—Dinh Q Nguyen
(74) *Attorney, Agent, or Firm*—Gary K. Price

(57) ABSTRACT

A self-propelled and self-contained shrouded walking boom unit including a small tank and pump mounted on the unit. The unit also has a small transmission and DC drive which makes the unit self-propelled. The configuration is such that the operator walks in front of the spray applicator system with the spray being applied behind the operator. The operator steers the applicator and controls the spray from a handle attached to a single front steering wheel.

11 Claims, 6 Drawing Sheets

SELF-PROPELLED WALKING SPRAY BOOM

CROSS REFERENCES TO RELATED APPLICATIONS

U.S. Provisional Application for Patent No. 60/901,938 filed Feb. 16, 2007, with title "Self-Propelled Walking Spray Boom" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to a device used to apply liquids to surfaces such as lawns.

2. Brief Description of Prior Art

It has been conventional practice to spray liquids to fertilize and protect outdoor plants such as lawns and gardens. There has long been problems with spraying chemicals, problems including over-application, runoff, the wind carrying overspray and the exposure of workers and surrounding surfaces to the overspray and also to workers tracking through chemicals.

FIG. 1 shows a prior art spray applicator 100. In the prior art spray applicators 100 were walked behind and included a hose 102 that had to be attached to a source of pressurized liquid. This tethered the device making it more difficult to use. Also, the operator had to walk through the applied liquid, also the wheels and hose traveled through the applied chemical which was very undesirable. Also, since the user powers the unit, the ground speed is not constant, which leads to an inconsistent application of liquid. The prior art also often requires multiple operators, one to walk the applicator and others at the source of fluid for the hose 102. Another problem with the prior art is that the chemicals flow through a fitting in the handle so leaks are a dangerous problem for the operator.

As will be described, the preferred embodiments of the present invention overcome disadvantages of the prior art.

SUMMARY OF THE INVENTION

A self-contained walk ahead spray applicator including a drive wheel, a motor driving the drive wheel and a handle to a steering wheel such that rotation of the handle controls the direction of travel of the spray applicator. A battery powers the motor and a pump. The spray applicator includes a tank containing liquid, the pump pumping liquid from the tank to a nozzle under a protective shroud, wherein the drive wheel drives the spray applicator such that the handle leads the nozzle and wherein the steering wheel is ahead of the drive wheels.

Figure 1:
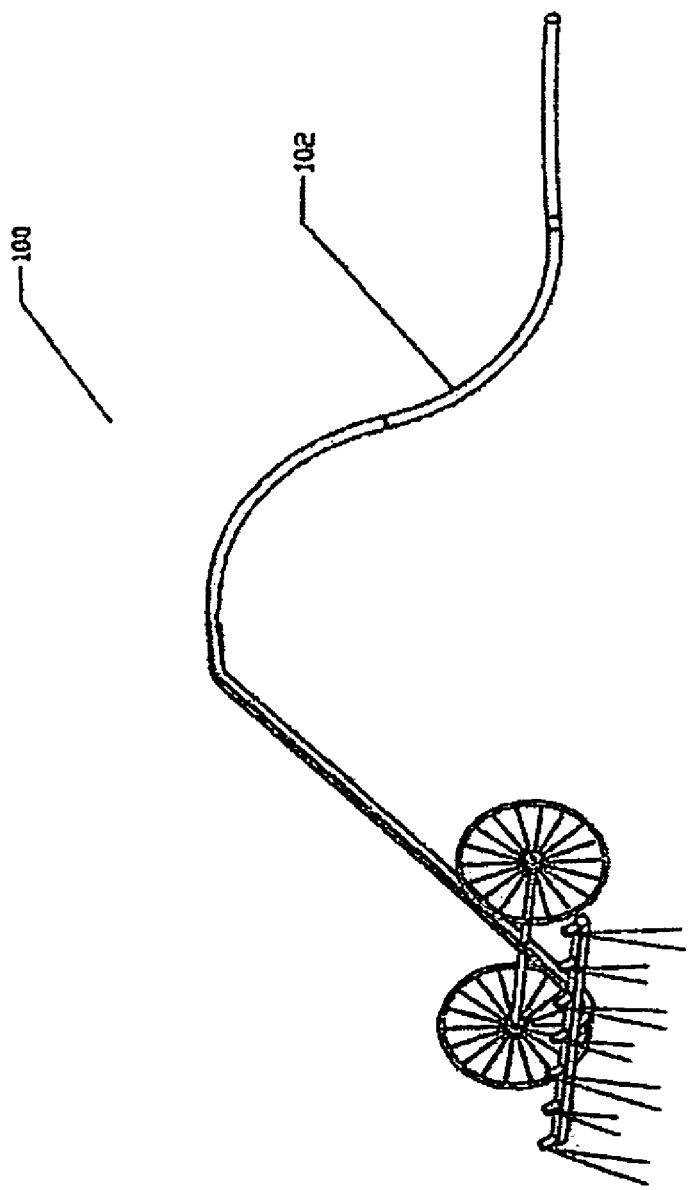
FIG. 1 shows a prior art spray applicator.

The present invention will be illustrated on the basis of the figures and following description of a preferred embodiment thereof.

DESCRIPTION OF THE PREFERRED EMBODIMENT

In accordance with the present invention, a spray applicator is disclosed. The spray applicator is directed to a self-propelled walking spray boom for applying liquids to surfaces such as lawns. Specifically, it will be noted in the drawings that the configuration of the self-propelled walking spray boom of the present invention is such that the operator walks in front of the spray applicator system with the spray being applied behind the operator. In the broadest context, the self-propelled walking spray boom consists of components configured and correlated with respect to each other so as to attain the desired objective.

Figure 2:
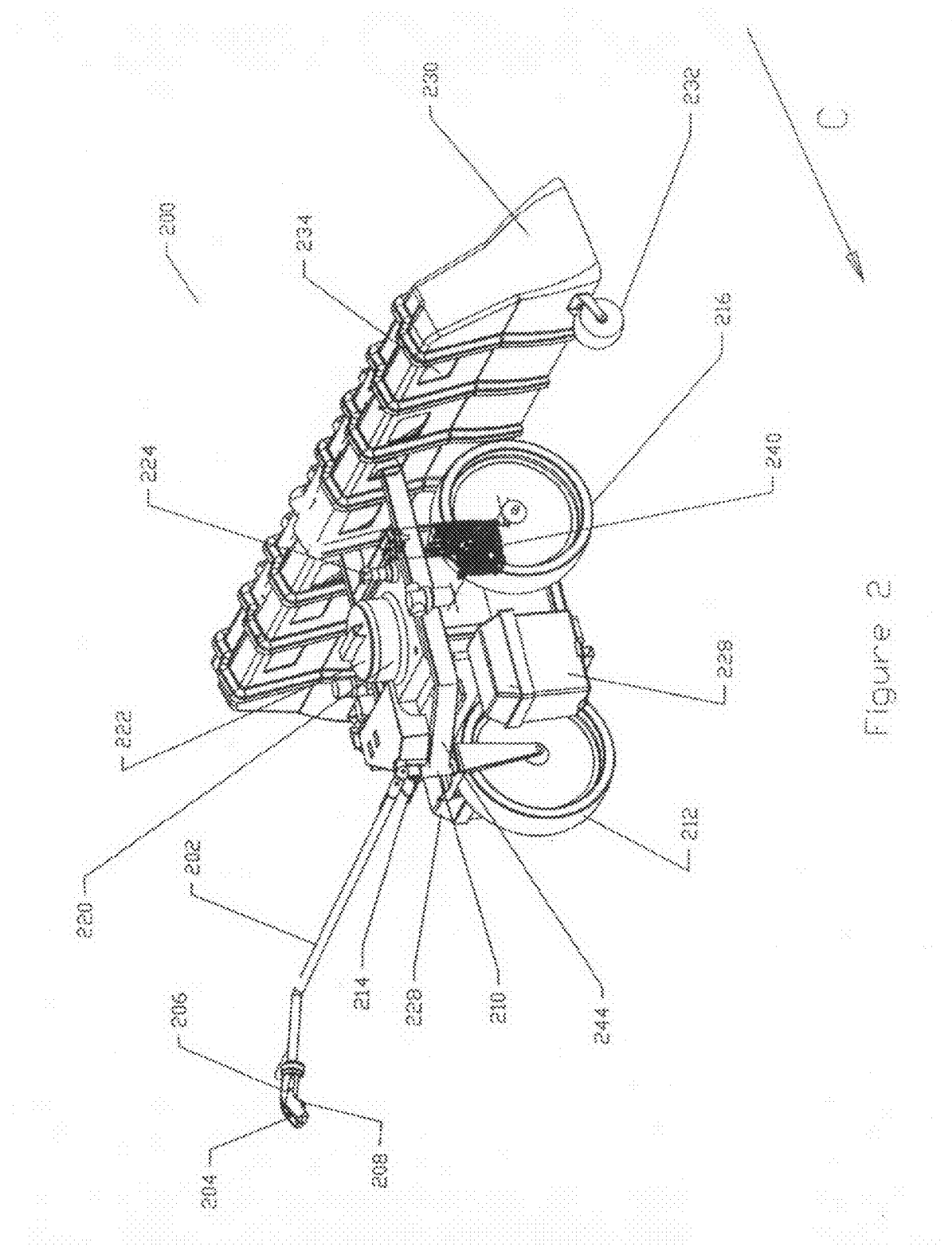
FIG. 2 shows a preferred embodiment of the present invention, a walk ahead spray applicator.

FIG. 2 illustrates a preferred embodiment of a spray applicator 200 made in accordance with the present invention. The spray applicator 200 includes a control such as an elongated handle 202. The handle 202 includes a grip 204, a spray control 206, and a throttle control 208. The handle 202 is connected to a pivot axle 210 that carries a steering wheel 212 such that said handle 202 and said steering wheel 212 rotate about a common axis.

The spray applicator 200 includes two (2) drive wheels 216 and a tank 220 that can contain liquids to be applied such as liquid fertilizer or herbicide, for example. The tank 220 includes a removable lid 222 to allow it to be filled, and the tank 220 can include an agitator. The tank 220 further includes a non-spill quick coupling system such that a nipple 224 installed on the tank 220 mates with a coupling (not shown) attached to an external hose for delivering liquids to the tank 220. The non-spill attachment as described provides an easy, safe method of filling the tank 220 without removing the lid 222 and eliminates exposing the operator to hazardous liquids during transfer.

The spray applicator 200 can include batteries 228 that can provide power for electric motors to drive the wheels 216 and to pressurize the tank 220. Any power source could be used to power the spray applicator 200.

The spray applicator 200 further includes a shroud 230 that prevents wind from blowing chemicals as they are applied. The shroud 230 includes a guide wheel 232 that prevent the ends of the boom and shroud 230 from digging into unlevel ground. The shroud 230 also includes windows 234 that allows an operator to observe the application of liquid. An electric motor and transmission can apply power directly to a drive wheel 216 or any drive arrangement can be used. A frame 244 connects the shroud 230 to the spray applicator 200.

Figure 3:
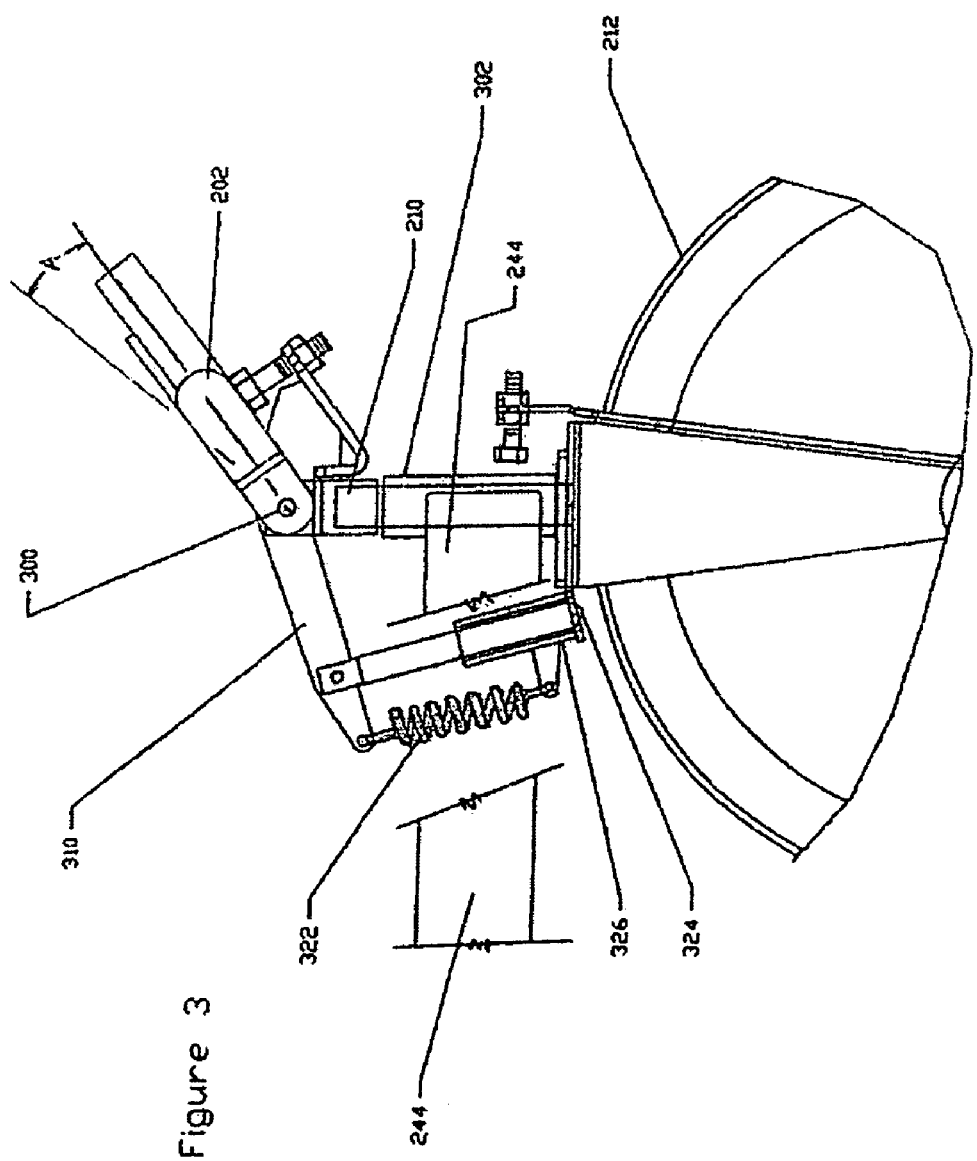
FIG. 3 shows detail of the spray applicator of FIG. 2.

FIG. 3 shows further details of the spray applicator 200. The handle 202 is pinned 300 to the pivot axle 210. The pivot axle 210 is mounted in bushings 302 connected to the frame 244. Rotation of the handle 202 about the axle 210 will cause the steering wheel 212 to turn allowing the user to steer the spray applicator 200. The handle 202 carries an adjustable lever arm 310 that also is pinned at 300. The adjustable lever arm 310 controls a brake assembly 320 that includes a spring 322 that biases a pawl 324 into engagement with the steering wheel 212. Up and down movement of the handle 202 through angle "A" controls the application of the brake pawl 324. The brake assembly 320 can be a "deadman" brake with the spring 322 being strong enough to apply the pawl 324 if the handle 202 is released by an operator. The spring 322 is mounted on an end of lever arm 310 and also to a bushing 326 carried on the frame 244. The pawl 324 slides in the bushing 326.

Figure 4:
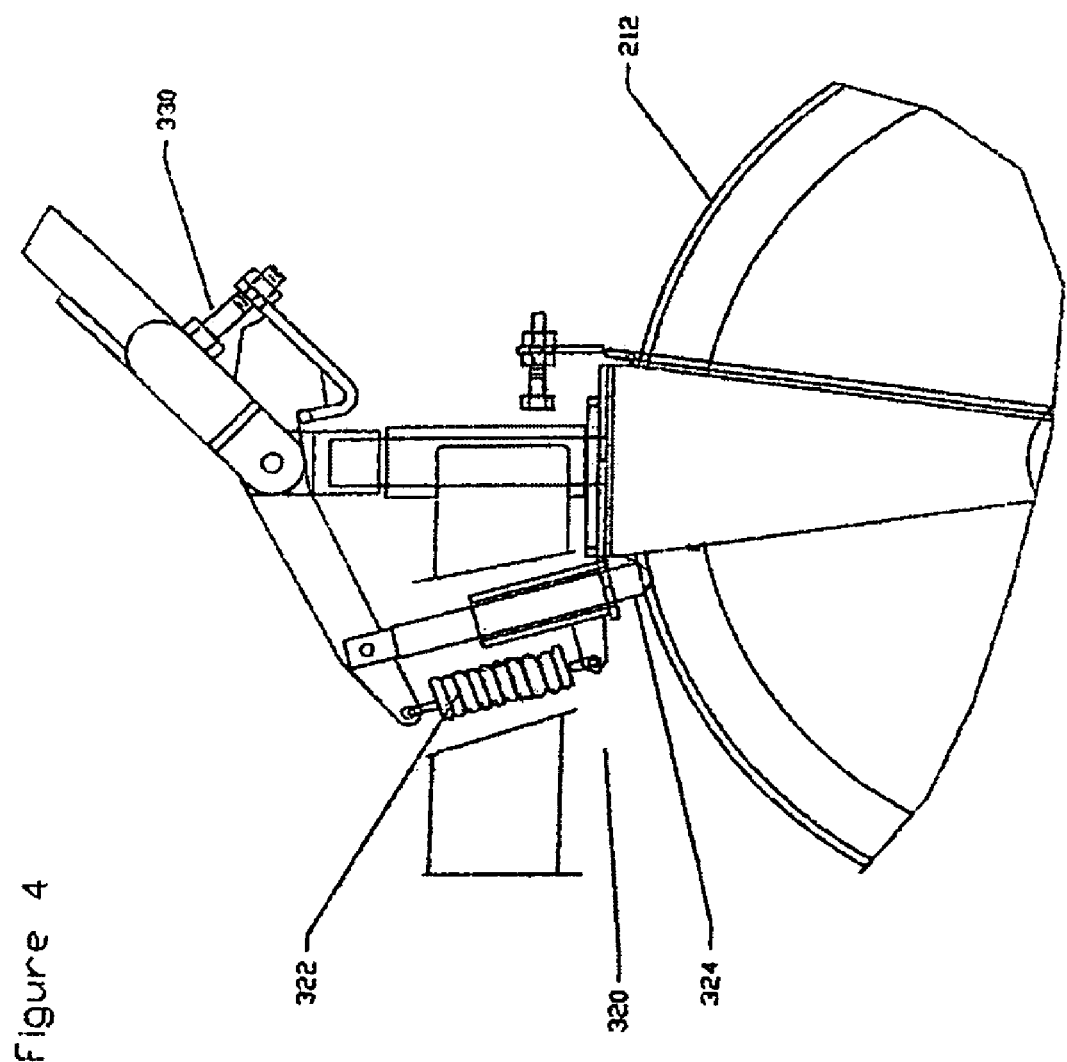
FIG. 4 shows additional details of the spray applicator of FIG. 2.

FIG. 4 shows the brake assembly 320 in the braking position with the pawl 324 engaging the steering wheel 212, and the spring 322 in its contracted position. It will be understood that as the steering wheel 212 is turned using handle 202, the braking assembly 320 also rotates maintaining the pawl 324 above the steering wheel 212 at all times. Threaded member 330 can be used to adjust the position of the brake assembly 320 relative to the handle 202.

Figure 5:
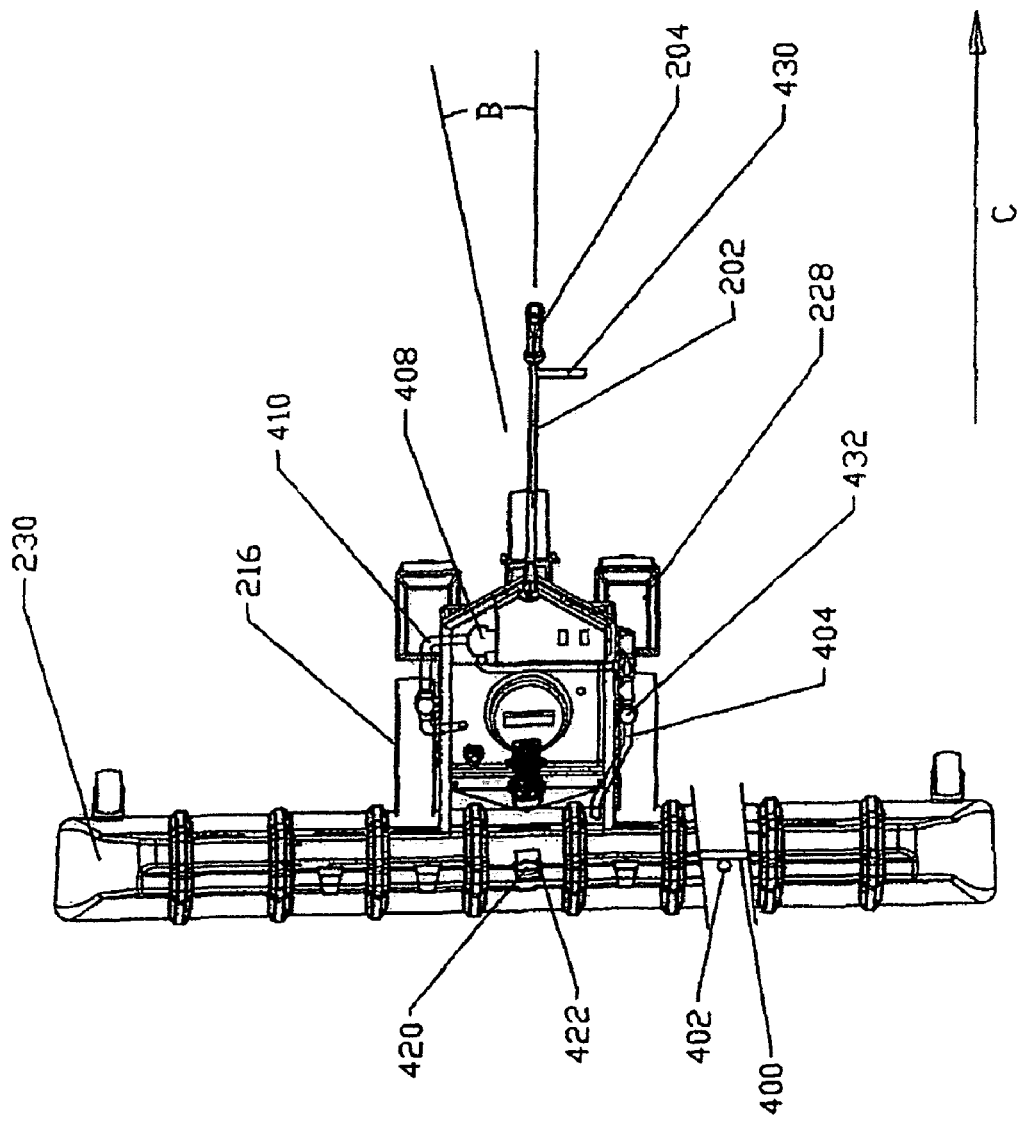
FIG. 5 shows a partial cross-sectional view of the spray applicator of FIG. 2.

FIG. 5 is a partial cross-sectional view from above the spray applicator 200. The shroud 230 is shown partially cut-away to expose the boom frame 400 that supports the light-weight shroud 230, and a spray nozzle 402 contained in the shroud and receiving liquid from the pressurized tank 220 through hose 404 and electric pump 408, which in turn receive fluid through hose 410. An operator can monitor fluid pressure using gauge 420 which is mounted to the boom frame 400 through opening 422 in the shroud. FIG. 5 also shows a secondary handle 430 provided to give ergonomic relief to the operator. Arrow "B" shows the directions that the handle 202 can turn about pivot 210. Arrow "C" shows the normal direction of travel during application of liquid such that the spray applicator 200 trails the user. FIG. 5 also shows a control 432 at the pump 408 that can control the rate of flow of liquid to the nozzles 402.

Figure 6:
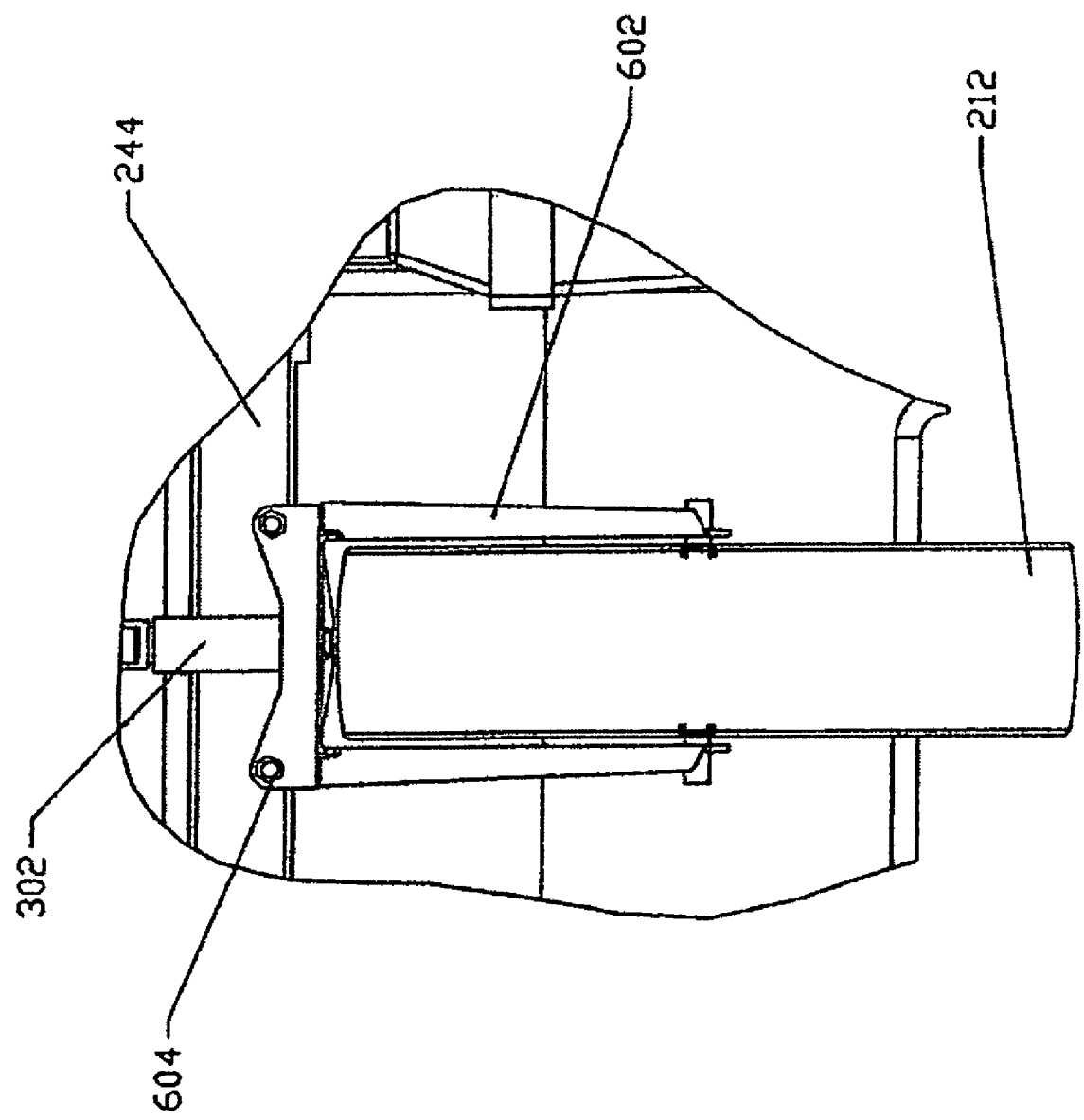
FIG. 6 shows further details of the spray applicator of FIG. 2.

FIG. 6 shows a portion of the steering of the spray applicator 200. The steering wheel 212 is held in a fork 602. The fork 602 includes two (2) adjustable stops 604 that limit the amount of turn of wheel 212, which allows an operator to adjust an amount of turn desired. The adjustable stops 604 can be bolts that impact on a fixed surface such as a frame 244.

In use, a user holds handle 202 by either grip 204 or 430 and walks in direction "C" with the spray applicator 200 trailing. Liquid fertilizer, herbicide or pesticide is pumped from tank 220 and is applied under the shroud 230 by nozzles 402. The drive wheels 216 are powered at a constant speed to control the application of chemical. Adjustable stops 604 limit the rotation of handle 202 such that when an operator is turning 180 degrees for a next pass, the operator simply turns the handle to the stop and the system aligns for the next pass. In use, an operator can control the direction of travel of the spray applicator simply by pointing the long axis of the handle in the direction of travel desired.

Although the description above contains many specificities, these should not be construed as limiting the scope of the invention but as merely providing illustrations of some of the presently preferred embodiments of the invention. It would be obvious to those skilled in the art that modifications may be made to the embodiments described above without departing from the scope of the present invention. Thus, the scope of the invention should be determined by the appended claims in the formal application and their legal equivalents, rather than by the examples given.

We claim:

1. A self-contained walking spray applicator comprising:
    a drive wheel,
    a motor driving said drive wheel,
    a handle, said handle mounted to a steering wheel such that rotation of the handle controls the direction of travel of the spray applicator,
    a battery powering said motor and a pump,
    a tank containing liquid, said pump pumping said liquid from said tank to a nozzle under a protective shroud,
    wherein said drive wheel drives said spray applicator such that said handle leads said nozzle and wherein said steering wheel is ahead of said drive wheels,
    wherein said handle includes a spring actuated brake, wherein the application of said brake is controlled by raising and lowering said handle,
    wherein the direction of travel of said spray applicator is controlled by turning the handle to the left to travel left and turning the handle to the right to travel right,
    wherein said motor is a DC motor and includes a constant speed setting and wherein said motor directly engages said drive wheel.

2. The applicator as recited in claim 1, wherein said handle includes a liquid flow control that controls the application of liquid by said nozzle.

3. The applicator as recited in claim 2, wherein said brake is a deadman control such that release of said handle will cause said spring to actuate said brake.

4. The applicator as recited in claim 3, wherein a frame of said spray applicator carries adjustable limits that limit the travel of said handle to the left and to the right.

5. A self-contained walking ahead spray applicator comprising:
    at least one powered drive wheel
    a control, said control connected to a steering wheel such that movement of the control controls the direction of travel of the spray applicator,
    a battery powering said powered drive wheel and a pump,
    a tank adapted to contain liquid, said pump including an inlet hose in said tank and said pump including an outlet hose connected to a nozzle,
    wherein said powered drive wheel drives said spray applicator such that said control leads said nozzle and wherein said steering wheel is ahead of said drive wheels such that an operator holding said control walks ahead of said spray applicator,
    wherein said control is an elongated handle and said handle includes a brake means, wherein the application of said brake means is controlled by raising and lowering said handle,
    wherein said brake means is a deadman control such that release of said handle will actuate said brake means,
    wherein said motor is a DC motor and includes a constant speed setting and wherein said motor directly engages said wheel drive.

6. The applicator as recited in claim 5, wherein said handle includes a liquid flow control that controls the application of liquid by said nozzle.

7. The applicator as recited in claim 5, wherein said handle and said steering wheel are mounted to a mutual axis of rotation and a direction of travel of said spray applicator is controlled by said handle pivoting said steering wheel about said mutual axis.

8. A walk ahead spray applicator comprising:
    at least one powered drive wheel,
    a control handle, said control handle connected to a steering wheel such that movement of the control handle controls the direction of travel of the spray applicator,
    a battery powering said power drive wheel and a pump,
    a tank adapted to contain liquid, said pump including an inlet hose in said tank and said pump including an outlet hose connected to a nozzle, wherein said powered drive wheel drives said spray applicator such that said control handle leads said nozzle and wherein said steering wheel is ahead of said drive wheels such that an operator holding said control walks ahead of said spray applicator, wherein said control handle and said steering wheel are mounted to a mutual axis of rotation and the direction of travel of said spray applicator is controlled by pointing said handle, wherein said control handle is an elongated handle and said handle includes a brake means, wherein the application of said brake means is controlled by raising and lowering said handle, wherein said motor is a DC motor and includes a constant speed setting and wherein said motor directly engages said drive wheel.

9. The applicator as recited in claim 8, wherein said handle includes a liquid flow control that controls the application of liquid by said nozzle.

10. The applicator as recited in claim 9, wherein said spray applicator carries adjustable limits that limit the travel of said handle to the left and to the right.

11. The applicator as recited in claim 8, wherein said brake is a deadman control such that release of said handle will cause said spring to actuate said brake.

* * * * *